US007480735B2

(12) United States Patent
Shapiro et al.

(10) Patent No.: US 7,480,735 B2
(45) Date of Patent: Jan. 20, 2009

(54) SYSTEM AND METHOD FOR ROUTING NETWORK TRAFFIC THROUGH WEIGHTED ZONES

(75) Inventors: Jeremy N. Shapiro, Brighton, MA (US); Stephen A. Jay, Chelmsford, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 870 days.

(21) Appl. No.: 10/659,942

(22) Filed: Sep. 11, 2003

(65) Prior Publication Data

US 2006/0168339 A1    Jul. 27, 2006

(51) Int. Cl.
*G06F 15/173* (2006.01)
(52) U.S. Cl. ............... 709/241; 709/238; 709/242; 370/238; 370/255; 370/256
(58) Field of Classification Search ............ 709/238, 709/241, 242; 370/238, 255, 256
See application file for complete search history.

(56) References Cited

U.S. PATENT DOCUMENTS

| | | | | |
|---|---|---|---|---|
| 5,031,093 A * | 7/1991 | Hasegawa | ............... | 709/241 |
| 5,233,604 A * | 8/1993 | Ahmadi et al. | ............... | 370/238 |
| 5,404,451 A * | 4/1995 | Nemirovsky et al. | ............... | 709/241 |
| 5,940,372 A * | 8/1999 | Bertin et al. | ............... | 370/238 |
| 6,151,305 A * | 11/2000 | Chen | ............... | 370/238 |
| 6,260,072 B1 * | 7/2001 | Rodriguez-Moral | ............... | 709/241 |
| 6,400,681 B1 * | 6/2002 | Bertin et al. | ............... | 370/218 |
| 6,879,564 B2 * | 4/2005 | Parham et al. | ............... | 370/256 |
| 7,082,463 B1 * | 7/2006 | Bradley et al. | ............... | 709/223 |

FOREIGN PATENT DOCUMENTS

EP    0 892 522 A1    1/1999

OTHER PUBLICATIONS

Behrens, J., et al: "Hierarchical Routing Using Link Vectors" Infocom '98 Seventeenth Annual Joint Conference of the IEEE Computer and Communications Societies. Proceedings. IEEE San Francisco, CA, USA Mar. 29-Apr. 2, 1998, New York, NY, USA IEEE, US, Mar. 29, 1998, pp. 702-710, XP010270426, ISBN: 0-7803-4383-2.

(Continued)

*Primary Examiner*—Kenny S Lin
*Assistant Examiner*—Thomas J Dailey
(74) *Attorney, Agent, or Firm*—Park, Vaughan & Fleming LLP

(57) ABSTRACT

A system and method for routing between nodes in a network or subnet. An end node is associated with multiple identifiers for routing purposes, and therefore multiple paths may exist between two end nodes. Network nodes and components (e.g., switches) are grouped into fault zones. Each physical enclosure of network entities may comprise a separate fault zone. For each zone through which a path between two nodes passes, a weight is calculated equal to the number of paths between the nodes that traverse that zone. Path weights are calculated for each path between the nodes, equal to the sum of the weights of each zone in the path. To improve network fault tolerance, new paths may be designed to avoid fault zones and existing paths with high weights. Instead of fault zones, other criteria may be used to assign weights, such as mean time between failures (MTBF), cost, speed, etc.

10 Claims, 3 Drawing Sheets

OTHER PUBLICATIONS

Herzberg, A: "Connection-based Communication in Dynamic Networks" Proceedings of the Eleventh Annual ACM Symposium on Principles of Distributed Computing ACM New York, NY, USA, Aug. 1992, pp. 13-24, XP002306311, ISBN: 0-89791-495-3.

* cited by examiner

SYSTEM AND METHOD FOR ROUTING NETWORK TRAFFIC THROUGH WEIGHTED ZONES

BACKGROUND

This invention relates to the field of computer systems and networking. More particularly, a system and methods are provided for routing network traffic through fault zones.

Routing of packets and/or other electronic communications through a network depends upon accurate routing. Network nodes that perform routing (e.g., switches, routers) usually maintain routing tables indicating how to route a communication addressed to a particular node.

In order to improve performance of the network, multiple paths to a given destination node may be available. The path traveled by a communication to the destination node may depend upon factors such as network congestion, which network links are functional or nonfunctional, the cost of traversing a particular path, and/or other factors. However, existing networks do not make efficient routing decisions based on how many current paths traverse particular network components or links (e.g., switches, wireless links). In particular, existing networks typically do not consider or promote the distribution of paths among different fault zones.

Also, in many network architectures (e.g., TCP/IP networks such as the Internet), the construction of routing tables is distributed among multiple nodes. Because of this distribution of labor, routing algorithms must be relatively simple so that each node is capable of performing them without impacting network traffic.

SUMMARY

Therefore, what is needed is a centralized system and method for evaluating and selecting different network paths, in which the distribution of paths among different fault zones may be considered.

In one embodiment of the invention, a system and methods are provided for configuring routing between nodes in a network or subnet. An end node may be associated with multiple identifiers for routing purposes, and therefore multiple paths may exist between two end nodes. Network nodes and components (e.g., switches) are grouped into fault zones. Each physical enclosure of network entities may comprise a separate fault zone. For each zone through which a path between two nodes passes, a weight is calculated equal to the number of paths between the nodes that traverse that zone.

Path weights are calculated for each path between the nodes, equal to the sum of the weights of each zone in the path. To improve network fault tolerance, new paths may be designed to avoid fault zones and existing paths with high weights. Instead of fault zones, other criteria may be used to assign weights, such as mean time between failures (MTBF).

DETAILED DESCRIPTION

Figure 1:
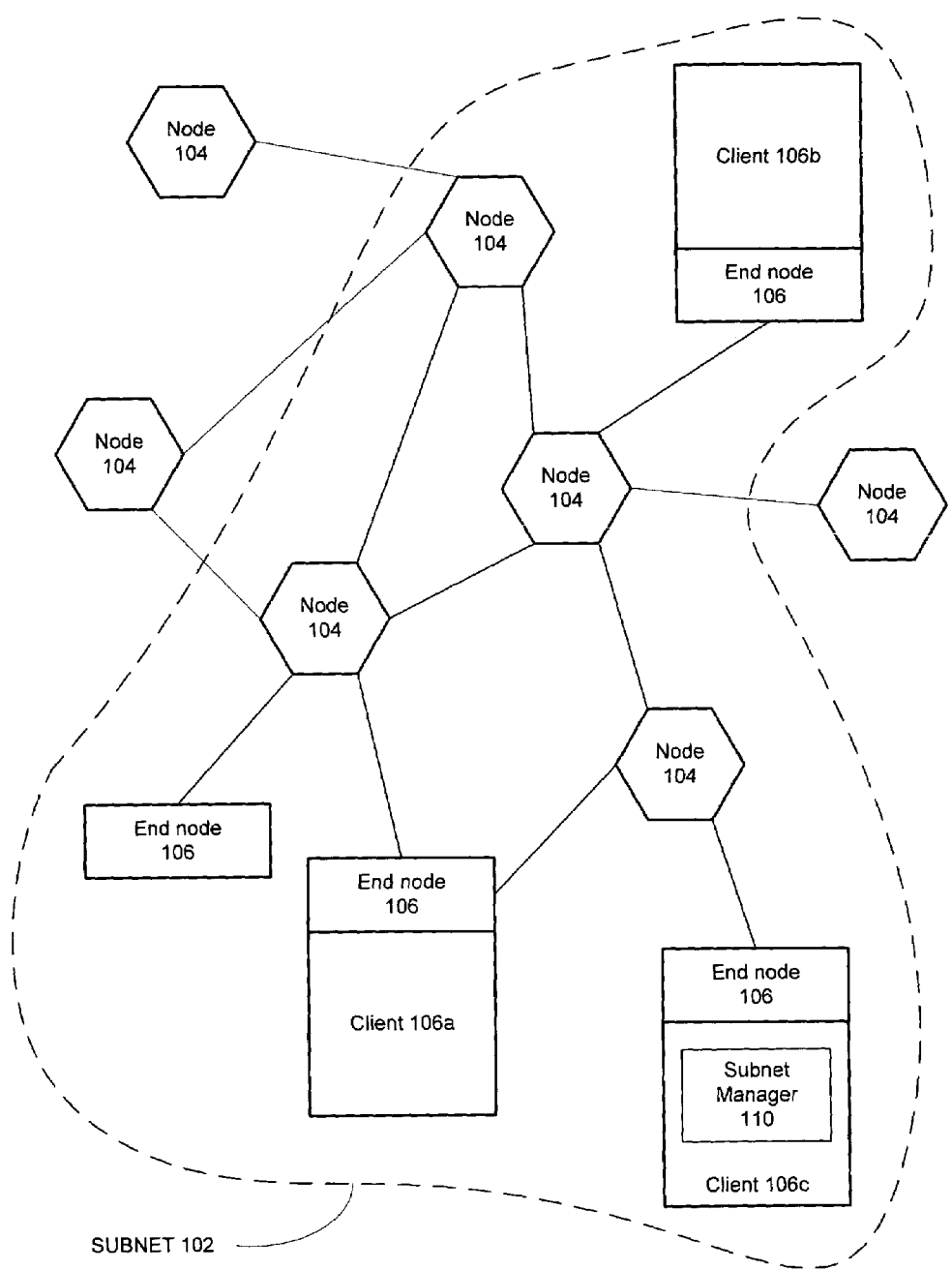
FIG. 1 is a block diagram depicting a subnet with a subnet manager, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer, a special-purpose computer or a network component (e.g., a switch, a network interface device). Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof In particular, the methods described herein may be implemented by a series of computer-executable instructions residing on a suitable computer-readable medium. Suitable computer-readable media may include volatile (e.g., RAM) and/or non-volatile (e.g., ROM, disk) memory. However, this does not include computer instruction signals embodied in a transmission medium (with or without a carrier wave upon which the signals are modulated).

In one embodiment of the invention, a system and method are provided for configuring, evaluating or selecting among different network paths to a particular node, in which the distribution of paths based on various criteria may be considered. For example, it may be desirable to promote a distribution of paths among different network fault zones, to improve fault tolerance. Or, it may be desirable to promote a distribution of paths based on the mean time between failure (MTBF) of network entities (e.g., switches, network links).

Embodiments of the invention are described below as they may be implemented within an InfiniBand environment. One skilled in the art will appreciate, however, that the invention is not limited to any particular network or communication technologies, and may be adapted for various such technologies.

InfiniBand is a communication architecture designed to provide high-speed interconnection between end nodes (e.g., channel adapters) and switches. Within a subnetwork or subnet of InfiniBand nodes, a subnet manager is responsible for detecting changes to the subnet configuration and updating nodes' routing tables.

FIG. 1 is a block diagram of an InfiniBand subnet, according to one embodiment of the invention. In this embodiment, subnet 102 includes nodes 104, which may be switches or other network entities capable of routing communications based on a routing table, routing tree or other schedule. Nodes 104 are configured to route communications within subnet 102 as well as the larger network that includes subnet 102.

Subnet 102 also includes end nodes 106, which may be channel adapters (e.g., target channel adapters and/or host channel adapters). End nodes, such as end nodes 106a-106c may be coupled to clients such as servers, desktops, portable or other types of computers or processing devices.

Within subnet 102, one client or computing device coupled to a node or end node is configured to execute a subnet manager. In FIG. 1, subnet manager 110 operates on client 106c. In another embodiment of the invention, the subnet manager may execute on a computer or computing device coupled to a node 104 instead of an end node. For redundancy and fault tolerance, a secondary subnet manager may be configured to execute on another node of subnet 102 in the event subnet manager 110, or client 106c or the end node coupling client 106c to the subnet, fails.

Subnet manager 110 is configured to detect changes in the configuration of subnet 102 and to update one or more routing tables for routing communications within the subnet. After updating a routing table, the subnet manager may disseminate it to all nodes in the subnet that are configured to route communications. One difference between the network environment in FIG. 1 and many traditional networks (e.g., networks employing the Internet Protocol), is that subnet routing decisions are centralized (i.e., in subnet manager 110) rather than being distributed among multiple nodes.

In InfiniBand, a single node may have multiple local identifiers (LIDs) for routing. Because it may have multiple LIDs, multiple paths can be defined to that node. Multiple paths may be defined to promote load balancing among the paths or constituent network links, to promote fault tolerance, and/or for other purposes. However, for each LID of a node, only one path will be active at a time.

In one embodiment of the invention, a method is provided for comparing multiple paths to a node having multiple LIDS, and/or for choosing between multiple paths based on one or more selected criteria (e.g., fault tolerance, mean time between failure (MTBF)).

To promote fault tolerance, it is desirable to define paths through a subnet such that failure of one fault zone affects a minimal number of paths and will not eliminate all paths to a node. MTBF may be considered in order to favor network links or components that are less likely to fail.

In an embodiment of the invention in which paths are defined to promote fault tolerance, multiple fault zones may be defined in a single network or subnet. Each zone can contain any subset of the nodes and end nodes in the network or subnet, and fault zones may overlap. However, in one implementation, all nodes and/or end nodes within a single physical enclosure are part of the same fault zone.

In this embodiment, for each LID of an end node (or other destination) in its subnet, a subnet manager notes the fault zones that are traversed by the current path to that LID. For each fault zone that is traversed by one or more paths to the end node, a weight is defined that is equal to the number of paths to the end node that traverse that fault zone.

Figure 2A:
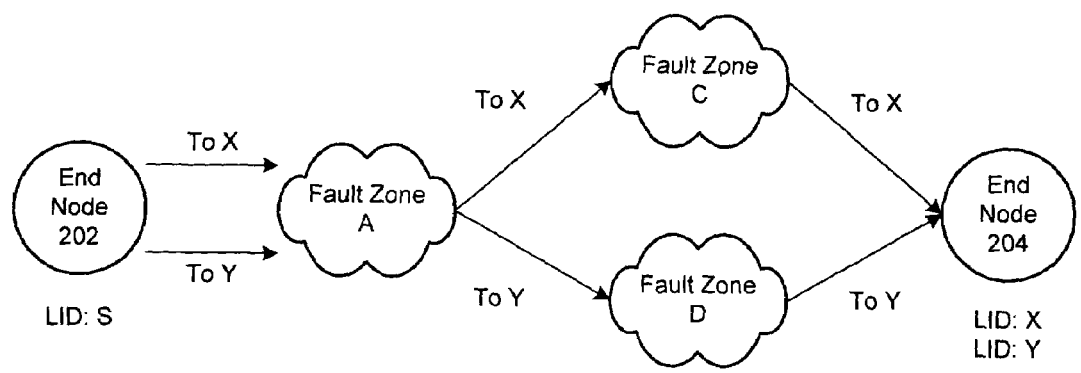
FIGS. 2A-2B depict the calculation of fault zone weights for different paths between end nodes, in accordance with an embodiment of the invention.

FIG. 2A demonstrates how this weighting process may be applied, according to one embodiment of the invention. In FIG. 2A, end node 202 has LID S, while end node 204 has two LIDs: X and Y. Thus, there are two paths from end node 202 to end node 204, one using a destination LID of X and the other using a destination LID of Y.

Both paths traverse fault zone A, but the path to LID X traverses fault zone C while the path to LID Y traverses fault zone D. Thus, fault zone A receives a zone weight, or path count, of two, and fault zones C and D both receive zone weights of one.

A path weight can then be defined to characterize the entire path to a LID. In one embodiment, a path weight is equal to the sums of the zone weights or path counts for each fault zone in the path. Thus, in FIG. 2A, the path weights of the two paths are calculated as:

path $S \rightarrow X$: zone weight($A$)+zone weight($C$)=2+1=3 path $S \rightarrow Y$: zone weight($A$)+zone weight($D$)=2+1=3

In one embodiment of the invention, when a new path becomes available between two end nodes in a subnet, the subnet manager calculates the path weight for the new path, and determines if it would be better to use the new path instead of the current path.

Figure 2B:
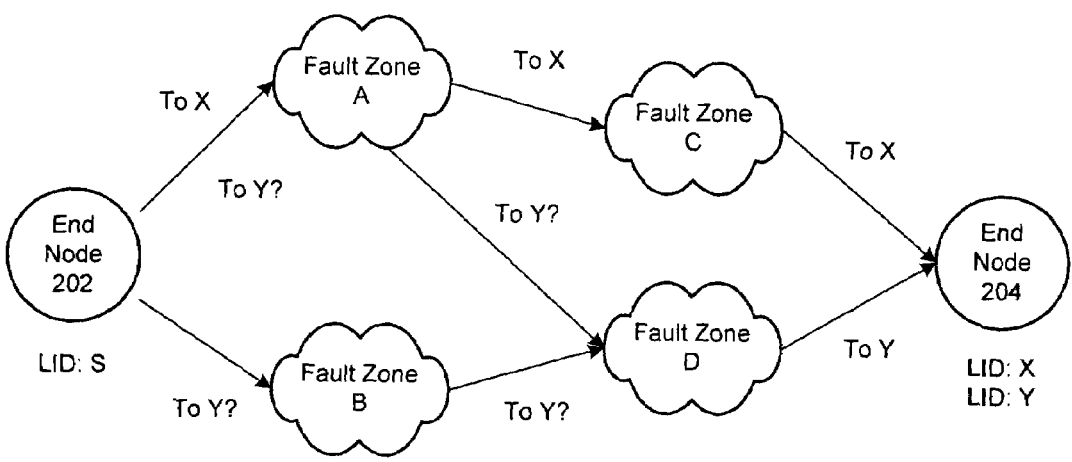

FIG. 2B depicts the subnet of FIG. 2A with a new path available from LID S to LID Y. Thus, the subnet manager will determine whether the new path, through fault zones B and D, is preferable to the current path through A and D. If the new path were adopted, the zone weights of fault zones B and D would both be one, and the path weight would be:

path $S \rightarrow Y$: zone weight($B$)+zone weight($D$)=1+1=2

Thus, the new path from LID S to LID Y would be adopted. Note that this would cause the path weight of path $S \rightarrow X$ to improve, because the zone weight of fault zone A would drop to one.

When a new path is selected, the subnet manager may update a routing tree or table, and disseminate the routing information to nodes in the subnet.

In the embodiment of the invention depicted in FIGS. 2A-2B, as more paths are defined between a pair of nodes in a subnet, the fault zones with the most paths will be weighted higher than other fault zones. Thus, new paths will tend to avoid the over-subscribed zones.

In one alternative embodiment of the invention, the calculation of zone weights may consider all system paths through a fault zone, not just all paths between a specified pair of end nodes. In this alternative embodiment, the weight assigned to a zone is proportional to the number of system paths that traverse that zone.

To address network issues or criteria other than fault zone reliability, weights may be assigned or calculated on some other basis. For example, weights could be based on the mean time between failure (MBTF) of a set of network entities (e.g., switches, links). In this example, entities that fail relatively frequently will receive worse weights, and hence fewer paths will traverse them. As one result, if such an entity does fail, it will likely have a less drastic effect on network traffic than it would otherwise. An entity's weighting may be proportional or inversely proportional to its expected MTBF.

Other factors or criteria that may be used to assign weights may include link speed, hop count, quality of service (QoS), financial cost, etc. Calculations of weights and paths may use any combination of these and/or other factors.

Figure 3:
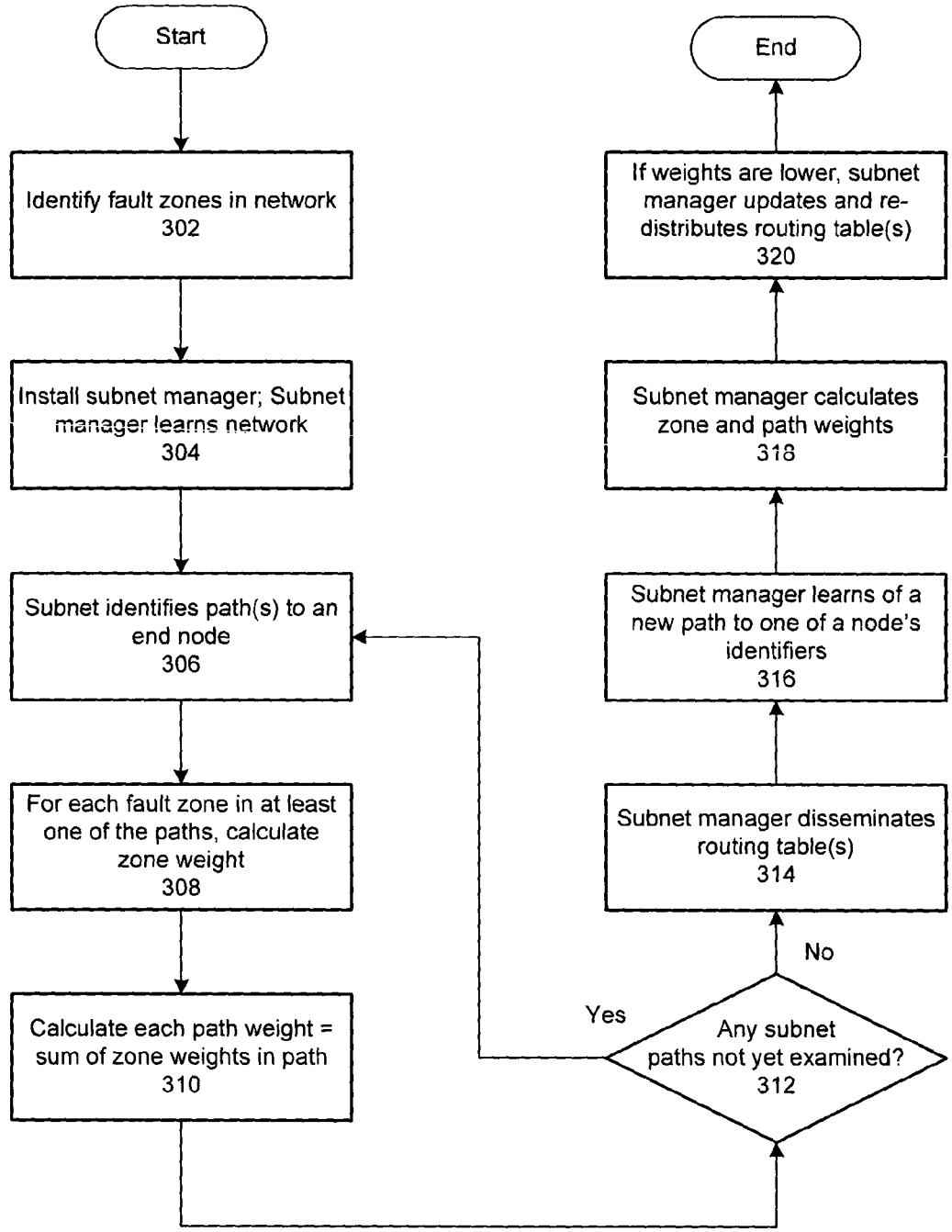
FIG. 3 is a flowchart demonstrating a method of determining routing between nodes in a subnet, according to one embodiment of the invention.

FIG. 3 is a flowchart demonstrating a method of calculating fault zone weights and path weights, according to one embodiment of the invention.

In operation 302, a network or subnet is configured with multiple fault zones. Each fault zone includes any number of network switching nodes (e.g., switches, routers), end nodes (e.g., channel adapters, network interface adapters), clients (e.g., servers, input/output subsystems, workstations) and/or other devices.

In operation 304, a subnet manager is installed and configured on a client within the subnet. The subnet manager learns the configuration of the subnet, to include nodes and their identifiers, links between nodes, etc.

In operation 306, the subnet manager identifies one or more paths from one node to an end node. The end node may have multiple identifiers (e.g., LIDs, network addresses).

In operation 308, for each fault zone that is used by at least one of the paths to the end node, the subnet manager calculates a zone weight equal to the number of paths to the end node that traverse that zone.

In operation 310, a path weight is calculated for each path, and is equal to the sums of the zone weights for each fault zone used by the path. The zone and/or path weights may be stored by the subnet manager for use in generating a routing table or tree for the subnet.

In operation 312, it is determined whether any more paths in the subnet need to be examined and given weights. The subnet manager may examine all paths between each pair of nodes within the subnet or just a subset of all paths. If additional paths need to be examined, the method returns to operation 306.

In operation 314, the subnet manager assembles and disseminates routing information to appropriate network entities (e.g., switches, routers). Illustratively, the subnet manager selects one path, based on path weights, between a given pair of nodes or node identifiers. Thus, each network switching element will apply the specified routing for that path until changed by the subnet manager.

In operation 316, the subnet manager learns of a new path to an end node or one identifier of an end node, for which a different path is currently specified in the subnet routing information.

In operation 318, the subnet manager calculates zone and path weights for the path, as described above.

In operation 320, if the path weight for the new path is lower than the path weight for the current path, the subnet manager updates the subnet routing information and disseminates updated routing data. The method then ends.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A processor-implemented method for enabling communication between a first and a second node in a network by routing network traffic through fault zones in the network, the method comprising:
    identifying a path from the first network node to the second network node, wherein the path is a possible routing path for communication between the first and second network nodes;
    identifying a set of fault zones through which the identified path passes;
    for each fault zone in the set of fault zones, assigning as a zone weight, the number of paths from the first network node to the second network node that include said fault zone, wherein the zone weight at each fault zone is equal to the number of routing paths that traverse that fault zone;
    calculating a path weight for the identified path, wherein said path weight is equal to the sums of said zone weights for each fault zone included in the identified path; and
    selecting the identified path as the current routing path for routing the network traffic from the first node to the second node, and enabling communication from the first node to the second node along the selected path.

2. The method of claim 1, further comprising:
    identifying a new path from the first network node to the second network node;
    assigning zone weights to each fault zone in the new path;
    calculating a new path weight for the new path; and
    if the new path weight is lower than said path weight for the identified path, selecting the new path as the current path for network traffic from the first node to the second node.

3. The method of claim 1, wherein:
    the first network node is identified by a first identifier;
    the second network node is identified by multiple identifiers, including a second identifier;
    selecting the identified path as the current path for network traffic from the first node to the second node comprises selecting the identified path as the current path for network traffic from the first node to the second node, wherein the second node is identified by the second identifier; and
    paths other than the identified path are selected as the current paths for network traffic from the first node to the second node, wherein the second node is identified by multiple identifiers other than the second identifier.

4. A computer readable medium storing instructions that, when executed by a computer, cause the computer to perform a method for enabling communication between a first and a second node in a network by routing network traffic through fault zones in the network, the method comprising:
    identifying a path from the first network node to the second network node, wherein the path is a possible routing path for communication between the first and second network nodes;
    identifying a set of fault zones through which the identified path leads;
    for each fault zone in the set of fault zones, assigning as a zone weight, the number of paths from the first network node to the second network node that include said fault zone, wherein the zone weight at each fault zone is equal to the number of routing paths that traverse that fault zone;
    calculating a path weight for the identified path, wherein said path weight is equal to the sums of said zone weights for each fault zone included in the identified path; and
    selecting the identified path as the current routing path for routing the network traffic from the first node to the second node, and enabling communication from the first node to the second node along the selected path.

5. A processor-implemented method for enabling communication between a first and a second node in a subnet by determining routing between nodes in the subnet, the method comprising:
    identifying multiple fault zones in the subnet, each fault zone comprising one or more components of the subnet;
    configuring a central subnet manager to manage routing between nodes in the subnet;
    identifying a set of paths from a first node having a first identifier to a second node having multiple identifiers, including a second identifier, wherein the set of paths are possible routing paths for communication from the first node to the second node using any of the multiple identifiers;
    for each fault zone traversed by one or more of the paths, establishing a zone weight based on the number of paths from the first node to the second node that traverse said fault zone, wherein the zone weight at each fault zone is equal to the number of routing paths that traverse that fault zone;
    for each path in the set of paths, establishing a path weight from the sums of the zone weights for each fault zone traversed by said path; and for each of the multiple identifiers of the second node, selecting as the current routing path from the first node to the second node from said set of paths, the path having the least path weight, and enabling communication from the first node to the second node along the selected path.

6. A computer readable medium storing instructions that, when executed by a computer, cause the computer to perform a method for enabling communication between a first and a second node in a subnet by determining routing between nodes in the subnet, the method comprising:

identifying multiple fault zones in the subnet, each fault zone comprising one or more components of the subnet;

configuring a central subnet manager to manage routing between nodes in the subnet;

identifying a set of paths from the first node having a first identifier to the second node having multiple identifiers, including a second identifier, wherein the set of paths are possible routing paths for communication from the first node to the second node using any of the multiple identifiers;

for each fault zone traversed by one or more of the paths, establishing a zone weight based on the number of paths from the first node to the second node that traverse said fault zone, wherein the zone weight at each fault zone is equal to the number of routing paths that traverse that fault zone;

for each path in the set of paths, establishing a path weight from the sums of the zone weights for each fault zone traversed by said path; and for each of the multiple identifiers of the second node, selecting as the current routing path from the first node to the second node from said set of paths, the path having the least path weight, and enabling communication from the first node to the second node along the selected path.

7. A system for enabling communication between nodes in a subnet by determining routing through the subnet comprising multiple fault zones, comprising:

a network node configured to interface a client computing device with the subnet, wherein each node is identifiable by one or more node identifiers; and a client computing device, comprising:
  a processor; and
  a subnet manager module configured to determine routing between a first node and a second node in the subnet, wherein the first node is addressable by a first identifier and the second node is addressable by multiple identifiers, including a second identifier;

wherein said subnet manager determines routing between the first node and second node by:

for each fault zone in the subnet traversed by a possible routing path from the first node to the second node, calculating a zone weight based on the number of possible routing paths from the first node to the second node that traverse said fault zone, wherein the zone weight at each fault zone is equal to the number of routing paths that traverse that fault zone;

for each of the paths from the first node to the second node, calculating a path weight based on the sums of said zone weights for the fault zones traversed by said path; and selecting as the current routing path from the first node to the second node identified by the second identifier, the path having the least path weight, and enabling communication from the first node to the second node along the selected path.

8. The system of claim 7, wherein the client computing device farther comprises:
  a memory configured to store path weights of current paths between multiple pairs of node identifiers.

9. The system of claim 7, wherein said memory is further configured to store, in association with each of the current paths, zone weights for fault zones traversed by the current path.

10. The system of claim 7, wherein said subnet manager is further configured to disseminate routing information to a plurality of nodes in the subnet, said routing information including said current path from the first identifier to the second identifier.

* * * * *

UNITED STATES PATENT AND TRADEMARK OFFICE
CERTIFICATE OF CORRECTION

| | | |
|---|---|---|
| PATENT NO. | : 7,480,735 B2 | Page 1 of 1 |
| APPLICATION NO. | : 10/659942 | |
| DATED | : January 20, 2009 | |
| INVENTOR(S) | : Jeremy N. Shapiro et al. | |

It is certified that error appears in the above-identified patent and that said Letters Patent is hereby corrected as shown below:

In claim 8 (at column 8, line 27), please replace the word "farther" with the word --further--.

Signed and Sealed this

Seventeenth Day of March, 2009

JOHN DOLL
*Acting Director of the United States Patent and Trademark Office*